Aug. 6, 1940.   E. G. BIEDERMAN   2,210,056
PROJECTION WELDER
Filed July 19, 1939   2 Sheets-Sheet 1

INVENTOR.
EDWARD G. BIEDERMAN.
BY Barnes, Kisselle, Laughlin & Raisch
ATTORNEYS.

Aug. 6, 1940.   E. G. BIEDERMAN   2,210,056
PROJECTION WELDER
Filed July 19, 1939   2 Sheets-Sheet 2
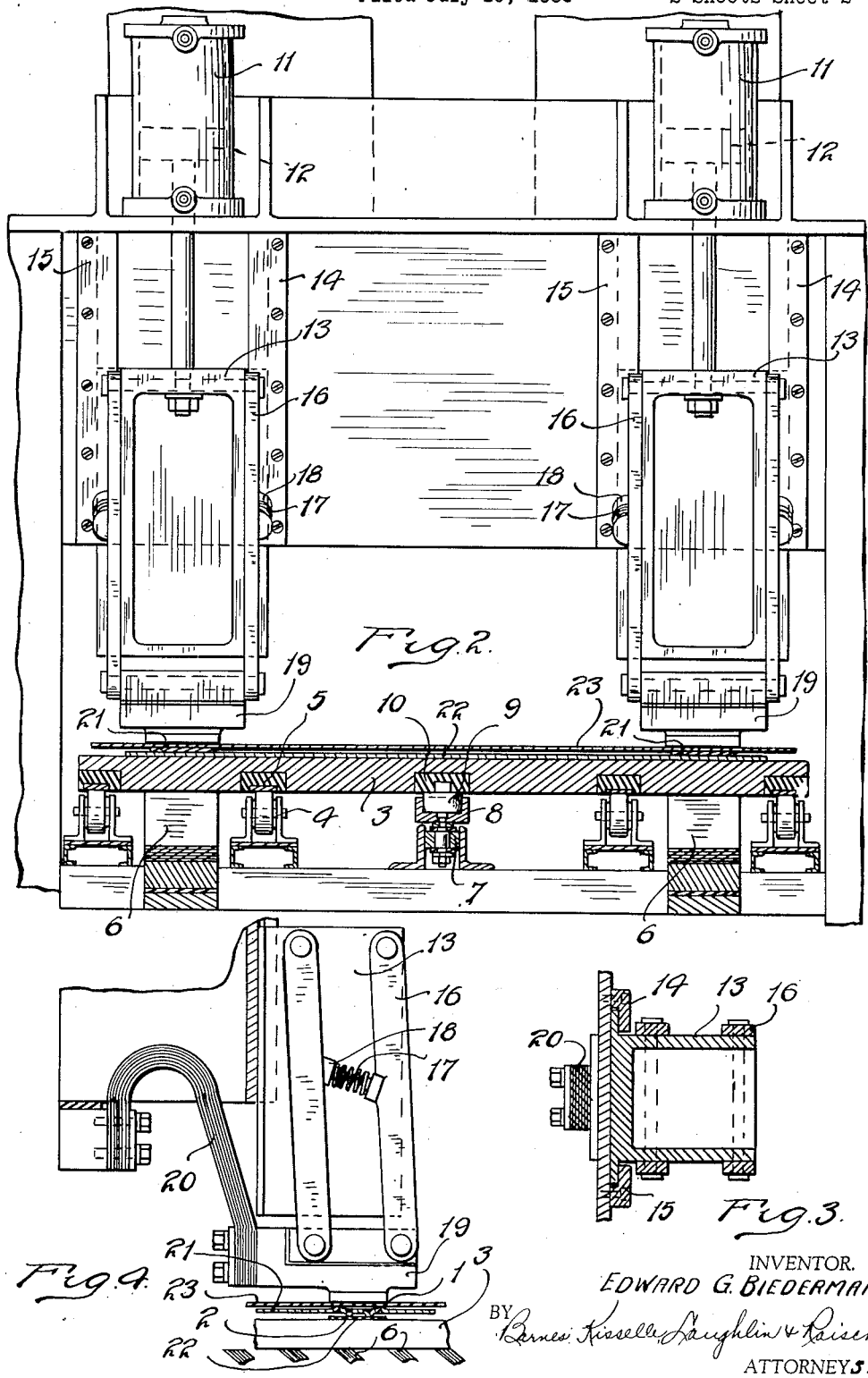
INVENTOR.
EDWARD G. BIEDERMAN.
BY
Barnes, Kisselle, Laughlin & Raisch
ATTORNEYS.

Patented Aug. 6, 1940

2,210,056

UNITED STATES PATENT OFFICE 2,210,056

PROJECTION WELDER

Edward G. Biederman, Detroit, Mich., assignor to General Motors Corporation, Detroit, Mich., a corporation of Delaware Application July 19, 1938, Serial No. 220,071

3 Claims. (Cl. 219—4)

This invention relates to projection welding "on the fly."

In the drawings:

Fig. 2 is a cross section through the carrier showing the front of the two welders.

Fig. 3 is a section on the line 3—3 of Fig. 1.

Fig. 4 is a detail elevation showing a part of one of the welders.

Projection welding is very old and consists of using punched out points on one or both pieces of sheet metal and then applying large pad electrodes one above and one below the work. The sheets will only contact at the points and, consequently, the current only passes through the sheets at the points and the work is welded and fused together in a plurality of spot welds.

This projection welding has always been done, so far as I am advised, on stationary machines. It is the purpose of the present invention to provide an arrangement whereby the work can be properly punched with the projections, placed on a carrier in assembled relation and welded while the carrier moves continuously along.

Figure 1:
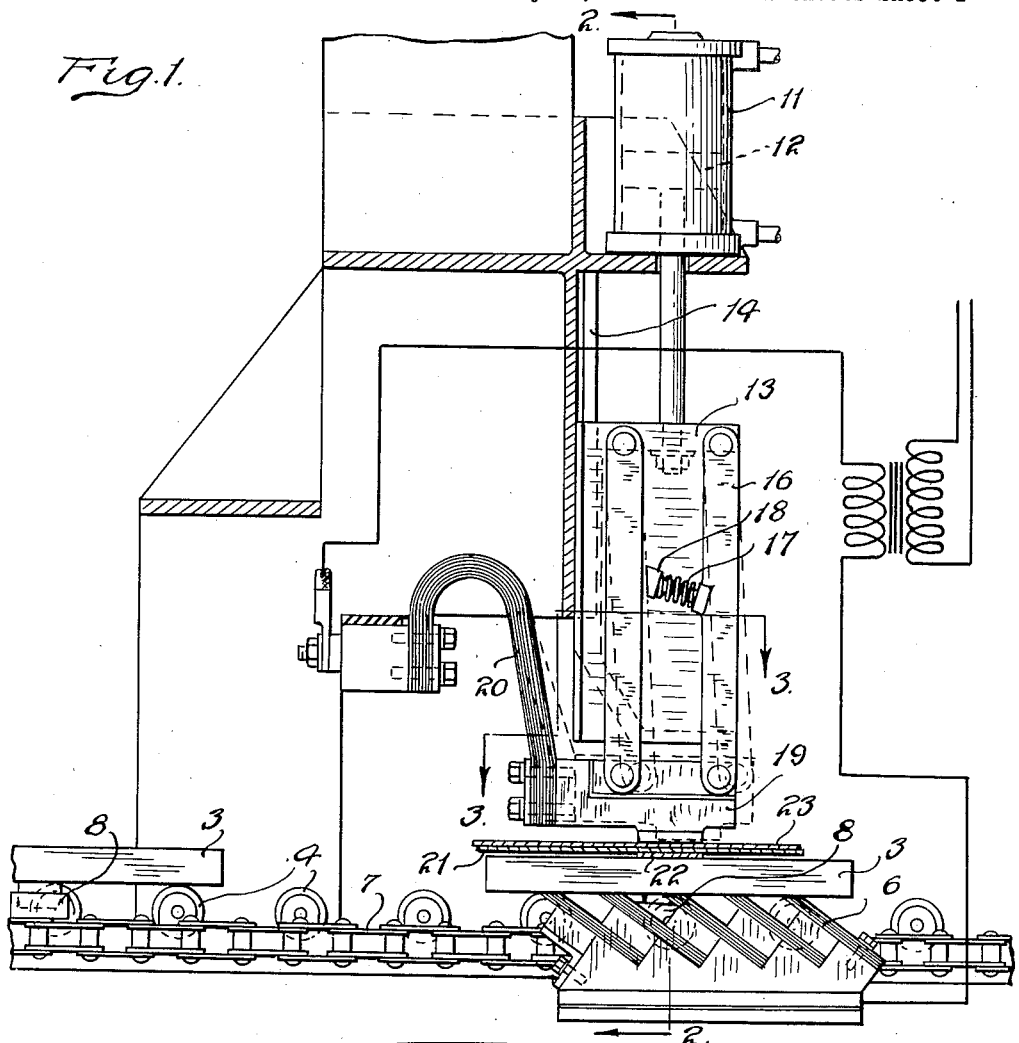
Fig. 1 is a side elevation of the machine.

Referring to Fig. 4: It will be seen that here three pieces of strip metal are shown. The center piece has projections 1 and 2 pointing upwardly and downwardly respectively. A carriage or plate 3 of copper rides over the rolls 4 which contact the plate through wear plates or strips of fiber or other insulating material strips 5. The copper portion of the plate contacts the copper brushes 6 which are part of the secondary circuit as shown in Fig. 1. The chain 7 carries the work plate along, the chain being located in the center of the carrier and carrying a socket 8 in which fits a roller 9 carried by the insulating block 10 in the carriage.

At the proper time, as the carriage comes along, a valve (not shown) may be tripped by the carriage or operated by hand to send fluid into the cylinders 11 to cause the pistons 12 to move downwardly pressing the vertically guided cross heads 13 downwardly. These cross heads are guided in the grooves formed by the strips 14. This is shown in Fig. 3. To each of these cross heads is pivoted four parallel arms or links 16. Springs 17 bearing against lugs 18 on the cross heads and against two of the parallel arms 16 tend to keep the arms swung to the right in Fig. 4. Then, as the piston comes down, it brings the electrode pad 19 into contact with the work. These lugs also act as stops for the links on the return stroke. This electrode pad is connected through the laminated bus bar 20 with the secondary circuit, as shown in Fig. 1. When the upper electrode grips the work and forces it against the lower pad 3, the electrodes grip the work and travel a slight distance with it which will be seen by comparing the dotted lines of Fig. 1 with the full lines shown therein. As soon as the fluid is released and reversed in the cylinders 11, the upper electrode pad will be lifted off the work and the springs 17 will return the pad to the right hand position.

Figure 5:
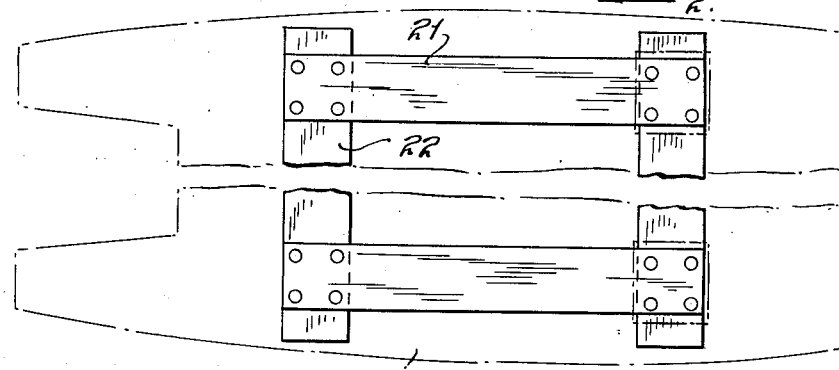
Fig. 5 is a plan view of the work.

This invention is useful, for instance, in welding reinforcing strips to the floor pans for automobile bodies, such as shown in Fig. 5, where a longitudinal strip 21 is welded to the cross strip 22 which, in turn, is welded to the floor pan 23. Many other uses may be found for it.

I claim:

1. In a welding machine, a carriage moving only in one direction and arranged to carry work provided with a multiplicity of punched out points for projection welding, said carrier forming an electrode pad of considerable contact area to bridge all the said points and for connection with part of the secondary circuit, an electrode pad of substantially the same area movable upon the opposite side of the work and connected with said secondary and arranged to travel a limited distance along with the work carrier while the projection welding is taking place, fluid operated means for pressing the pad against the work to cause the work to carry the pad along with the work and permitting travel of the work while said pad is upon the work, and means for returning the said pad to its initial position.

2. In a welding machine, a carriage, means for continuously moving the carriage, said carriage forming an electrode pad, commutator brushes located along the path of travel of the carriage and in the secondary of a welding circuit and arranged to wipe said electrode pad, a second electrode pad for bearing down on the work on the opposite side while the carriage moves continuously along, said pad arranged for a limited travel with the work while it moves along, the said pad also being located in said secondary circuit, supporting means for said second pad comprising a cross head movable substantially perpendicularly to the path of travel of the carriage and thrust means between the cross head and pad having movement with both a perpendicular and parallel component with respect to the pad and permitting the pad to move along with the work while the welding is being done.

3. In a welding machine, a continuously moving carriage, said carriage forming an electrode pad, commutator brushes contacting the pad located along the path of travel of the carriage and in the secondary of a welding circuit, a second electrode pad for bearing down on the work on the opposite side while the carriage moves continuously along, said pad arranged for a limited travel with the work while it moves along, the said pad also being located in said secondary circuit, supporting means for said pad comprising a cross head movable substantially perpendicularly to the path of travel of the carriage and thrust means between the cross head and pad in the form of links permitting the pad to move along with the work while the welding is being done.

EDWARD G. BIEDERMAN.